Aug. 13, 1940.  B. H. FLYNN  2,211,262
ROAD CONSTRUCTING AND/OR RECONDITIONING MACHINE
Filed Nov. 25, 1938  2 Sheets-Sheet 1
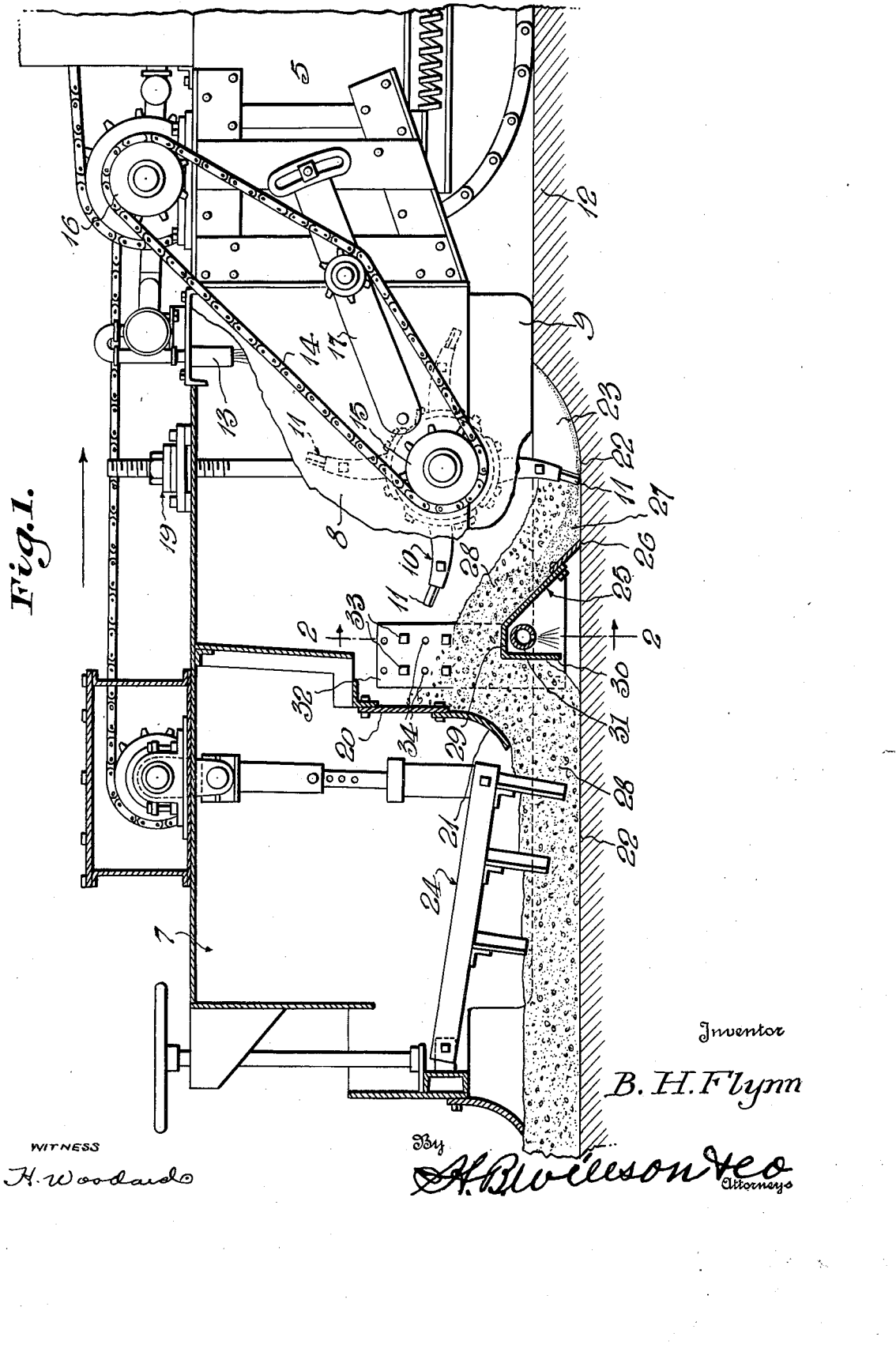
Inventor
B. H. Flynn Aug. 13, 1940.   B. H. FLYNN   2,211,262
ROAD CONSTRUCTING AND/OR RECONDITIONING MACHINE
Filed Nov. 25, 1938   2 Sheets-Sheet 2
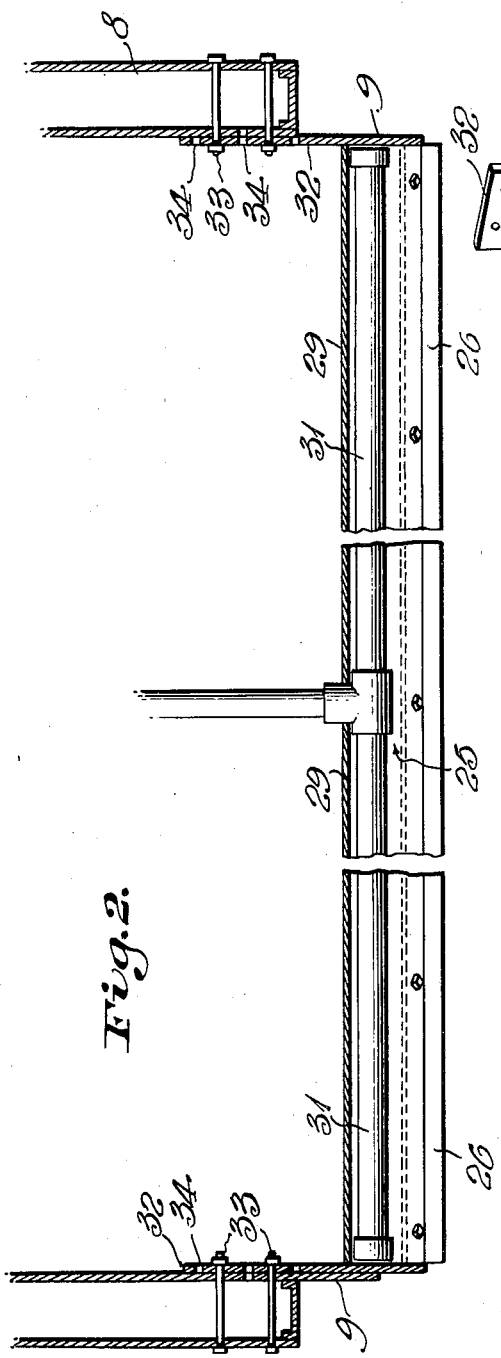
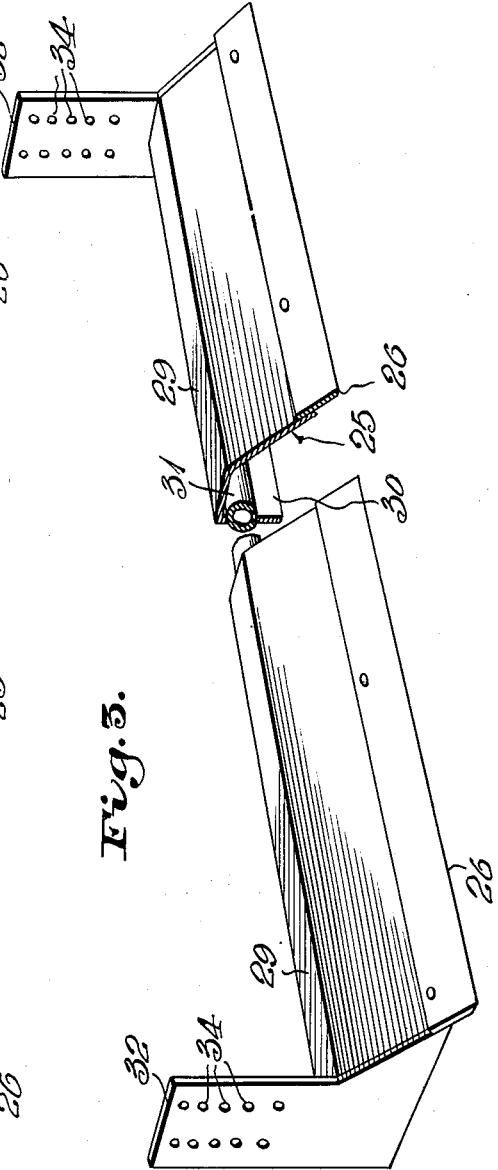

Patented Aug. 13, 1940

2,211,262

UNITED STATES PATENT OFFICE 2,211,262

ROAD CONSTRUCTING AND/OR RECONDITIONING MACHINE

Benjamin H. Flynn, Alexandria, La.

Application November 25, 1938, Serial No. 242,379

1 Claim. (Cl. 94—39)

The invention relates primarily to machines which disintegrate old-road material in situ or soil in situ to a required depth of cut, mix a binder or other ingredient with the disintegrated material and deposit the mixed materials upon the bottom of the cut for compaction, to form either a reconditioned roadway or a new roadway. Such machines have heretofore left quite an appreciable amount of only partly mixed materials upon the bottom of the cut, particularly when mixing in a dry ingredient such as cement, and the required homogeneous mixture for best results has not, therefore, been attainable. One of the objects of the present invention, however, is to overcome this difficulty by providing the machine with means for moving the partly mixed materials left on the bottom of the cut by the mixing operation, into position for further mixing with the other materials, preferably into the reach of the mixing means for mixing with the materials being acted upon for the first time by said mixing means.

A further object is to provide, in a machine which removes old-road material or soil from its original bed and re-deposits the material upon said bed, means for discharging a water-proofing agent or other ingredient directly upon said bed while the old-road material or the soil is free from said bed, this feature of the invention being particularly advantageous in cases where calcium chloride, salt or other ingredients are to be mixed with the material for stabilization.

A still further object is to provide a novel machine in which a portion of the means for moving the partly mixed materials on the bottom of the cut into position for further mixing, as above explained, acts to hold the mixed materials elevated from the bottom of the cut while the waterproofing agent or other ingredient is being discharged onto said cut bottom.

With the foregoing in view, the invention resides in the novel subject matter hereinafter described and claimed, description being accomplished by reference to the accompanying drawings.

Fig. 1 is a longitudinal sectional view partly in side elevation, the front end or tractor portion of the machine being broken away.

Fig. 2 is a fragmentary transverse sectional view on line 2—2 of Fig. 1.

Figure 3 is a detail perspective view.

The drawings above briefly described illustrate a general construction which may well be followed, but it is to be understood that within the scope of the invention as claimed, numerous variations may be made.

A mobile machine is provided, the frame 5 of which is mounted at its front end in any suitable way upon a tractor 6, preferably of the endless tread or crawler type, the rear end of said frame being provided with a downwardly open housing 7, said housing having longitudinal side members 8 provided with downwardly projecting longitudinal plates 9 to confine the material being worked. The front portion of the housing 7, in the present disclosure, contains a transverse rotatably mounted cutter 10 having circumferentially and longitudinally spaced teeth 11 for disintegrating either an old roadway 12 for re-use of the same road material on the original bed, or for disintegrating natural soil with which to mix other ingredients to form a new road, such as a "soil-cement" road. The cutter 10 also serves to mix any desired binder or other ingredient with the material while the latter is being disintegrated and for illustrative purposes, I have shown spraying means 13 for a bituminous or other binder, positioned to discharge such binder onto the material immediately ahead of said cutter. The cutter may, of course, be driven in any suitable way, a chain 14 and sprockets 15 and 16 being shown to constitute part of the driving means. A suitable tightener 17 having an idle sprocket 18 is illustrated for the chain 14, keeping it sufficiently taut for effective operation and still permitting vertical adjustment of the cutter. As illustrative of the many ways in which said vertical adjustment could be effected, I have illustrated a threaded adjuster 19.

The materials disintegrated and mixed by the rotary cutter 10 are rearwardly thrown and are intercepted by a transverse baffle 20 having a flexible lower edge portion 21 beneath which the mixed materials pass to be deposited upon the bottom 22 of the cut 23 made by said cutter, and I preferably provide suitable power-actuated tamping means 24 in the rear portion of the housing 7 to compact the mixed materials, said tamping means being preferably constructed and operated in the manner shown in my pending U. S. application Serial No. 216,577, filed June 28, 1938.

In mixing the bituminous binder or any other desired ingredient or ingredients with the material being disintegrated, the rotary cutter 10 performing the mixing operation, necessarily leaves some only partly mixed material 27 upon the bottom 22 of the cut 23, but I make novel provision whereby these partly mixed materials are moved into position for mixing with the other materials to obtain a more thorough mixture. In the present disclosure, the partly mixed material left on the bottom 22 of the cut 23 by the mixing operation, is moved forwardly into the reach of the cutter 10 and by means of this cutter is mixed with the material being first acted upon by said cutter. The means for moving the material in this manner preferably consists of a transverse rearwardly inclined scraper blade 25 mounted immediately behind the cutter 10 and provided with a replaceable or adjustable cutting bit 26. By this arrangement, the partly mixed material 27 is scraped from the bottom 22 of the cut 23 and is held within reach of the cutter 10, whereby the latter will mix said partly mixed material 27 with the materials 28 being disintegrated and mixed with the binder or other ingredient, thus insuring a homogeneous mixture.

Preferably the upper or rear edge of the scraper blade 25 is integral with or otherwise joined to a flat horizontal bar 29 extending transversely of the machine and a vertical transverse bar or plate 30 is suitably joined to the rear edge of said bar 29 and projects downwardly therefrom, the three members 25, 29 and 30 thus forming an arched hood extending transversely of the machine, over which the mixed materials must pass. Within this hood, I have illustrated a spray pipe 31 for discharging a water-proofing agent or other desired ingredient upon the bottom 22 of the cut 23 while the mixed material is free from and spaced upwardly from said bottom. The use of this or an equivalent arrangement for applying a water-proofing agent or the like to the bottom of the cut or bed upon which the mixed material is to lie, is of particular advantage in cases where calcium chloride, salt or other ingredients are to be mixed with the materials, for stabilization.

Any desired means may be employed for mounting the scraper 25 and associated elements in the housing 7. For illustrative purposes, I have shown vertical plates 32 welded or otherwise secured to the ends of the members 29 and 30, said plates being secured by bolts 33 to the side members 6. By providing vertically spaced bolt holes 34 through any of which the bolts 33 may be passed, the scraper may be vertically adjusted as desired, to keep the edge of the bit 26 in the desired relation with the bottom 22 of the cut 23 or with the other bed upon which the reconditioned or newly constructed roadway is to lie.

As the machine progresses along an old roadway which is to be reconditioned, or upon natural soil to be mixed with other ingredients for roadmaking, the rapidly rotating cutter 10 disintegrates the old road or the soil and at the same time mixes a binder or other ingredient with the disintegrated material. The mixing operation leaves some material upon the bottom 22 of the cut 23 in only partly mixed condition, but this partly mixed material 27 is forwardly scraped by the scraper blade 25 and constantly held in reach of the cutter, causing the latter to mix this material with the materials being acted upon for the first time by said cutter, effecting a homogeneous mixture. This mixture is both thrown and fed rearwardly under the baffle 20 and is deposited upon the bed or cut bottom 22, for compaction, to form either a reconditioned roadway or a new road, as the case may be. Preferably, some suitable compacting means, such as 24, is embodied in the machine but it will be obvious that all compaction could well be done by a machine or machines separate from that which accomplishes the disintegrating and mixing.

Whenever advisable, a water-proofing agent or other ingredient may be deposited upon the bed or cut bottom 22, this being accomplished in the present disclosure by means of the spray pipe 31.

From the foregoing, it will be seen that novel and advantageous provision has been made for carrying out the objects of the invention, and while preferred features have been disclosed, attention is again invited to the possibility of making variations within the scope of the invention as claimed.

I claim:

A machine for working old road material in situ or soil in situ to produce a reconditioned or a new roadway, said machine comprising a mobile frame; a transverse driven rotary cutter on said frame having projecting cutting teeth for disintegrating the old road or soil to a predetermined depth of cut and for mixing another ingredient with the disintegrated material; means for rotating said cutter in a direction to move said teeth downwardly and rearwardly through the material being disintegrated and mixed; and a transverse rearwardly inclined scraper blade mounted on said frame immediately behind said rotary cutter for elevating the mixed material from the bottom of the cut and then dropping them onto said bottom, said scraper blade having a scraping edge positioned to travel along said bottom of the cut to forwardly scrape some of the mixed material along said bottom of the cut, said scraper blade being sufficiently close to said rotary cutter as to hold the forwardly scraped material within reach of said projecting teeth of said cutter, whereby said teeth may effect mixing of said forwardly scraped material with the materials being disintegrated and mixed for the first time.

BENJAMIN H. FLYNN